United States Patent
Edpalm et al.

(10) Patent No.: US 12,400,368 B2
(45) Date of Patent: Aug. 26, 2025

(54) ENCODING DEVICE AND A METHOD FOR ENCODING AN IMAGE FRAME INCLUDING SELECTIVE RESTRICTION OF OFFSET COMPRESSION VALUES

(71) Applicant: Axis AB, Lund (SE)

(72) Inventors: Viktor Edpalm, Lund (SE); Alexander Toresson, Lund (SE); Johan Palmaeus, Lund (SE)

(73) Assignee: AXIS AB, Lund (SE)

( * ) Notice: Subject to any disclaimer, the term of this patent is extended or adjusted under 35 U.S.C. 154(b) by 386 days.

(21) Appl. No.: 18/073,993

(22) Filed: Dec. 2, 2022

(65) Prior Publication Data

US 2023/0177733 A1    Jun. 8, 2023

(30) Foreign Application Priority Data

Dec. 8, 2021 (EP) ..................................... 21213154

(51) Int. Cl.
*G06T 9/00* (2006.01)
*G06T 3/40* (2006.01)

(52) U.S. Cl.
CPC . *G06T 9/00* (2013.01); *G06T 3/40* (2013.01)

(58) Field of Classification Search
CPC . G06T 9/00; G06T 3/40; H04N 19/14; H04N 19/176; H04N 19/124; H04N 19/182;
(Continued)

(56) References Cited

U.S. PATENT DOCUMENTS

2002/0154693 A1    10/2002  Demos et al.
2008/0192821 A1*   8/2008   Malayath ............. H04N 19/124
                                                         375/240.03
(Continued)

FOREIGN PATENT DOCUMENTS

EP          1679659 A1     7/2006
JP       H08265769 A  *  10/1996  ............... H04N 7/32
(Continued)

OTHER PUBLICATIONS

Sullivan, ITU-T/ISO/IEC document (Hongkong), "Adaptive quantization encoding technique using an equal expected-value rule," JVT-N011Jan (2005).
(Continued)

*Primary Examiner* — Tom Y Lu
(74) *Attorney, Agent, or Firm* — Volpe Koenig

(57) ABSTRACT

An encoding device and a method for encoding an image frame comprising a plurality of pixel blocks are provided. A respective offset compression value is set for each of the plurality of pixel blocks based on an interest level associated with the pixel block, wherein each offset compression value defines an offset in relation to a reference compression value set for the image frame. In the image frame, one or more low contrast regions having a contrast which is below a predefined contrast threshold are identified. For pixel blocks within the one or more low contrast regions having set offset compression values based on the associated interest levels higher than a predefined offset compression threshold, the set offset compression values are selectively restricted to be at most equal to the predefined offset compression threshold. The image frame is then encoded using the set offset compression values.

15 Claims, 1 Drawing Sheet

(58) Field of Classification Search
CPC ........ H04N 19/42; G06V 10/25; G06V 10/40;
G06V 10/764
See application file for complete search history.

(56) References Cited

U.S. PATENT DOCUMENTS

| | | |
|---|---|---|
| 2010/0310187 A1 | 12/2010 | Yang et al. |
| 2012/0069897 A1 | 3/2012 | Anselmo et al. |
| 2014/0003497 A1 | 1/2014 | Sullivan et al. |
| 2015/0016510 A1 | 1/2015 | Carisson et al. |
| 2016/0353107 A1 | 12/2016 | Lou et al. |
| 2017/0280139 A1 | 9/2017 | Thirumalai et al. |
| 2018/0376153 A1 | 12/2018 | Gokhale et al. |
| 2021/0243442 A1 | 8/2021 | Said et al. |
| 2022/0343102 A1* | 10/2022 | Wang ................... G06V 10/141 |
| 2023/0206447 A1* | 6/2023 | Kobayashi ........... G06V 10/774 |
| | | 382/159 |

FOREIGN PATENT DOCUMENTS

| | | |
|---|---|---|
| WO | 2008/116836 A2 | 10/2008 |
| WO | 2020/248099 A1 | 12/2020 |

OTHER PUBLICATIONS

Extended European Search Report dated May 18, 2022 for European Patent Application No. 21213154.4.

* cited by examiner

ENCODING DEVICE AND A METHOD FOR ENCODING AN IMAGE FRAME INCLUDING SELECTIVE RESTRICTION OF OFFSET COMPRESSION VALUES

FIELD OF INVENTION

The present disclosure relates to video encoding, and specifically to encoding an image frame including selective restriction of offset compression values.

TECHNICAL BACKGROUND

When encoding image frames divided into a plurality of pixel blocks into a video, an offset compression value, for example an offset quantization parameter (QP) value, in relation to a reference compression value may be set for each pixel block. The reference compression value may be set depending on an importance or interest level of a region in which the pixel block is located. The importance or interest level of a region may be set based on different criteria depending on the application. A problem with this approach is that it may result in artifacts or other quality issues of the resulting video, especially in regions where contrast is low. To this end, methods have been proposed in which compression values of pixel blocks are reduced by a fixed amount in regions with low contrast. This however introduces other issues related to encoding of the low contrast regions.

SUMMARY

The present disclosure provides a method and encoding device for encoding an image frame comprising a plurality of pixel blocks which overcomes or mitigates issues in known methods and systems.

According to a first aspect, a method for encoding an image frame comprising a plurality of pixel blocks, the method comprises setting a respective offset compression value for each of the plurality of pixel blocks based on an interest level associated with the pixel block, wherein each offset compression value defines an offset in relation to a reference compression value set for the image frame. The method further comprises identifying, in the image frame, one or more low contrast regions having a contrast which is below a predefined contrast threshold and, for pixel blocks within the one or more low contrast regions having set offset compression values based on the associated interest levels higher than a predefined offset compression threshold, selectively restricting the set offset compression values to be at most equal to the predefined offset compression threshold. The method further comprises encoding the image frame using the set offset compression values.

By interest level is meant a relative level of interest or importance of different regions of the image frame. What is considered to be of relative high interest or importance and what is considered to be of relative low interest or importance will depend on the application.

By a reference compression value is meant a compression value that has been selected to be the reference in relation to which the offset is set. The reference compression value may for example be an expected mean or median compression value over time, a maximum compression value, a minimum compression value etc. The offset may be negative, positive or '0'.

By contrast of a region is meant a measure of a variation of at least luminance values for pixels in the region, and low contrast regions hence means a region where the contrast according to that measure is below the contrast threshold. The measure of variation may for example be variance or standard deviation. The measure could additionally or alternatively be a measure of a variation of chroma values for pixels in the region.

If offset compression values of pixel blocks are reduced by a fixed amount in all low contrast regions, this will lead to a high cost in terms of bitrate after encoding for pixel blocks in some low contrast regions, namely in those pixel blocks that are located within regions that have been identified as important or of interest such that the pixel blocks have relatively high interest levels associated with them. For such low contrast regions, the offset compression value would already have been set low even without the reduction by the fixed amount. Introducing the reduction with the fixed amount risk reducing the offset compression value to become very low which would lead to a high cost in terms of bitrate after encoding.

By selectively restricting the set offset compression values to be at most equal to the predefined offset compression threshold for pixel blocks within the one or more low contrast regions having set offset compression values based on the associated interest levels higher than the predefined offset compression threshold, it is ensured that the set offset compression value is never higher than the predefined compression threshold for pixel blocks within the one or more low contrast regions. At the same time, the offset compression value for pixel blocks within the one or more low contrast regions that have a set offset compression value based on associated interest level that is lower than the predefined offset compression threshold, the set offset compression value will not be affected by the method of the first aspect and hence, the cost in terms of bitrate after encoding will not be affected for such pixel blocks. The risk of reducing the offset compression value to become very low for such pixel blocks which would lead to a high cost in terms of bitrate after encoding can thus be avoided.

The act of restricting may be performed together with the act of setting, such that the act of setting comprises setting the respective offset compression value for each of the plurality of pixel blocks based on an interest level associated with the pixel block, wherein, for pixel blocks within the one or more low contrast regions having set offset compression values based on the associated interest level higher than the predefined offset compression threshold, the set offset compression values are selectively restricted to be at most equal to the predefined offset compression threshold.

Alternatively, the act of setting may be performed before the act of restricting, wherein the act of restricting comprises, for pixel blocks within the one or more low contrast regions having set offset compression values based on the associated interest level higher than the predefined offset compression threshold, reducing the set offset compression values to be at most equal to the predefined offset compression threshold.

In the method of the first aspect, the image frame may comprise a plurality of regions each having a respective interest level. For each of the plurality of pixel blocks, the interest level associated with the pixel block is an interest level of a region of the plurality of regions in which the pixel block is located.

In the method of the first aspect, the set offset compression values may decrease with increasing interest level.

In the method of the first aspect, the contrast may be a contrast for a region of the image frame comprising more than one pixel block or a contrast for one pixel block.

In the method of the first aspect, the offset compression values may be offset quantization values, the reference compression value may be a reference quantization value, and the predefined offset compression threshold may be a predefined offset quantization threshold.

According to a second aspect, an encoding device configured to encode an image frame comprising a plurality of pixel blocks is provided. The encoding device comprises circuitry and an encoder. The circuitry is configured to execute a setting function, an identifying function, and a restricting function. The setting function is configured to set a respective offset compression value for each of the plurality of pixel blocks based on an interest level associated with the pixel block, wherein each offset compression value defines an offset in relation to a reference compression value set for the image frame. The identifying function is configured to identify, in the image frame, one or more low contrast regions having a contrast which is below a predefined contrast threshold. The restricting function is configured to, for pixel blocks within the one or more low contrast regions having set offset compression values based on the associated interest level higher than a predefined offset compression threshold, selectively restricting the set offset compression values to be at most equal to the predefined offset compression threshold. The encoder is configured to encode the image frame using the set offset compression values.

The above-mentioned optional features of the method according to the first aspect, when applicable, apply to this third aspect as well. In order to avoid undue repetition, reference is made to the above.

According to a third aspect, a non-transitory computer-readable medium is provided. The non-transitory computer readable medium has stored thereon instructions for implementing the method of the first aspect when executed on an encoding device of the second aspect. The instructions may for example be in the form of computer readable program code.

The above-mentioned optional features of the method according to the first aspect, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that the disclosure is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present disclosure will now be described in more detail, with reference to appended figures. The figures should not be considered limiting but are instead used for explaining and understanding. Like reference numerals refer to like elements throughout.

DETAILED DESCRIPTION

The present disclosure will now be described more fully hereinafter with reference to the accompanying drawings, in which currently preferred embodiments are shown. The claims may, however, be embodied in many different forms and should not be construed as limited to the embodiments set forth herein. Rather, these embodiments are provided for thoroughness and completeness, and to convey the scope of the claims to the skilled person.

Figure 1:
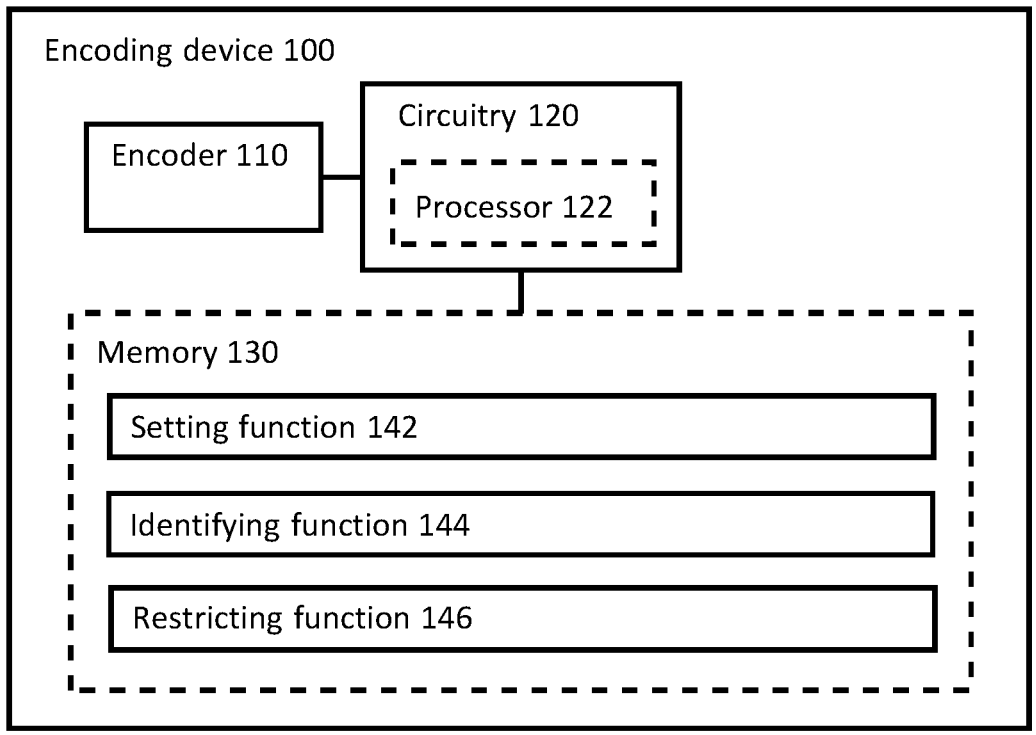
FIG. 1 is a schematic block diagram of an encoding device for encoding an image frame comprising a plurality of pixel blocks according to the present disclosure.

FIG. 1 illustrates an encoding device 100 for encoding an image frame comprising a plurality of pixel blocks according to the present disclosure. The encoding device 100 comprises an encoder 110 and circuitry 120.

The circuitry 120 is configured to carry out functions of the encoding device 100, e.g., functions in relation to setting of compression values and instructing the encoder 110 to use the set compression values. The circuitry 120 may include a processor 122, such as a central processing unit (CPU), microcontroller, or microprocessor. The processor 122 is configured to execute program code. The program code may for example be configured to carry out the functions of the encoding device 100.

The encoding device 100 may further comprise a memory 130. The memory 130 may be one or more of a buffer, a flash memory, a hard drive, a removable media, a volatile memory, a non-volatile memory, a random access memory (RAM), or another suitable device. In an example arrangement, the memory 130 includes a non-volatile memory for long term data storage and a volatile memory that functions as system memory for the circuitry 120. The memory 130 may exchange data with the circuitry 120 over a data bus. Accompanying control lines and an address bus between the memory 130 and the circuitry 120 may also be present.

Functions of the encoding device 100 may be embodied in the form of executable logic routines (e.g., lines of code, software programs, etc.) that are stored on a non-transitory computer readable medium (e.g., the memory 130) of the encoding device 100 and are executed by the circuitry 120 (e.g., using the processor 122). Furthermore, the functions of the encoding device 100 may be a stand-alone software application or form a part of a software application that carries out additional tasks related to the encoding device 100. The described functions may be considered a method that a processing unit, e.g., the processor 122, of the circuitry 120 is configured to carry out. Also, while the described functions may be implemented in software, such functionality may as well be carried out via dedicated hardware or firmware, or some combination of hardware, firmware and/or software.

The circuitry 120 is configured to execute a setting function 142 configured to set a respective offset compression value for each of the plurality of pixel blocks based on an interest level associated with the pixel block, wherein each offset compression value defines an offset in relation to a reference compression value set for the image frame.

The offset compression value for a pixel block indicates how a compression value of the pixel block is offset from the reference compression value. The offset compression value may for example be expressed as an additive offset. When the offset compression value is expressed as an additive offset, the compression value of a pixel block is obtained by adding the offset compression value of the pixel block to the reference compression value. The compression value of the pixel block, i.e., the compression of the pixel block, will then increase with increasing offset compression value.

The reference compression value may for example be an expected mean or median compression value over time, the mean or median compression value of all possible compression values, a maximum compression value of all possible compression values, a minimum compression value of all possible compression values etc.

The setting function 142 may be configured to set respective offset compression values for each of the plurality of pixel blocks in relation to encoding based on a division of the image frame into a plurality of regions each having a respective interest level. For each of the plurality of pixel blocks, the interest level associated with the pixel block is then an interest level of the region of the plurality of regions in which the pixel block is located and the setting function 142 is configured to set the offset compression value for the pixel block according to its interest level. Typically, the set offset compression values decrease with increasing interest level. Hence, the higher the interest level of the region in which the pixel block is located, the lower the offset compression value will be. It is to be noted that not only the absolute value of the offset compression value but also the sign of the offset compression value should be taken into account in relation to what is considered to be a lower one of two offset compression values. Hence, a negative offset compression value will correspond to a higher interest level than a positive compression value regardless of their respective absolute values.

The division of the image frame into the plurality of regions each having a respective interest level is provided as input to the setting function 142. What is considered to be a high interest and what is considered to be of low interest will depend on the application. For example, the division may be based on the results from object detection where regions including identified objects classified as persons or vehicles are considered to be of high interest whereas other regions not including such objects are considered to be of low interest. Alternatively, or additionally, the division may be based on results from motion detection where regions with detected motion are considered to be of high interest whereas other regions without motion are considered to be of low interest. The interest level may be divided into a set number of interest levels and the offset compression level may then be set based on the interest level according to a corresponding set number of offset compression values, e.g., wherein, the higher the interest level of the region in which the pixel block is located, the lower the offset compression value will be. The difference between the highest allowed offset compression level and the lowest allowed offset compression level may be based on how much quality difference is allowed between regions with highest interest and regions with lowest interest.

The circuitry 120 is further configured to execute an identifying function 144 configured to identify, in the image frame, one or more low contrast regions having a contrast which is below a predefined contrast threshold.

The contrast may be determined based on a measure of variation of luminance values of pixels in a region. Additionally, or alternatively, the contrast may be determined based on a measure of variation of chroma values of the pixels in the region. Whether to base the contrast on a measure of the variation of luminance values or chroma value, or both will typically depend on whether the interest level is set taking into account the luminance values or chroma values of both. For example, the variance or the standard deviation can be used as a measure of variation. When determining contrast in the image for use in identifying the one or more low contrast regions, the contrast may be determined for regions including only one pixel block or for regions comprising more than one pixel block.

For regions including only one pixel block, the contrast may be determined for that pixel block based only on the pixels of the pixel block, e.g., as the variance or standard deviation of luminance for pixels of the pixel block. In alternative, the contrast may be determined by first determining the respective contrast in the pixel block and neighbouring pixel block based only on the pixels of the respective pixel blocks. The final contrast in the pixel block would then be determined by taking into account also the contrast in the neighbouring pixel blocks, e.g., by applying a filter to the pixel block and the neighbouring pixel blocks.

For regions including more than one pixel block, the contrast may be determined based on a calculation for the more than one pixel blocks together, e.g., as the variance or standard deviation of luminance for pixels of all of the more than one pixel block. Alternatively, a separate contrast may first be determined for each pixel block of the more than one pixel block based on a separate calculation performed for each pixel block, e.g., as the variance or standard deviation of luminance for pixels of each pixel block, and the local contrast for the region may then be determined as a mean of the results for the separate pixel blocks, e.g., a mean of the variance or standard deviation for each pixel block.

The pixel blocks may for example be of sizes, 8×8, 16×6, 32×32, or 64×64 pixels. The circuitry 120 is further configured to execute a restricting function 146 configured to, for pixel blocks within the identified one or more low contrast regions having set offset compression values based on the associated interest level higher than a predefined offset compression threshold, selectively restricting the set offset compression values to be at most equal to the predefined offset compression threshold. Hence, the offset compression values of pixel blocks within the identified one or more low contrast regions are allowed to be equal to the predefined offset compression threshold but are not allowed to be higher than the predefined offset compression threshold. This is achieved by actively, and selectively, restricting the offset compression values of the pixel blocks within the one or more low contrast regions which, according to the interest level associated with those pixel blocks, would have been set to a value higher than the offset compression threshold. In other words, the offset compression value of each pixel block is set to the lower of the offset compression values based on the associated interest level and the predefined offset compression threshold.

By such selective restriction of the set offset compression values, it is ensured that the set offset compression is never higher than the predefined compression threshold for pixel blocks within the one or more low contrast regions. At the same time, the offset compression value for pixel blocks within the one or more low contrast regions that have a set offset compression value based on associated interest level that is lower than the predefined offset compression threshold, the set offset compression value will not be affected by the method of the first aspect and hence, the cost in terms of bitrate after encoding will not be affected for such pixel blocks. The risk of reducing the offset compression value to become very low for such pixel blocks which would lead to a high cost in terms of bitrate after encoding can thus be avoided. The selective restriction achieves a reduction of offset compression values only for pixel blocks which otherwise would have risked causing occurrence of artifacts or other quality issues but not to an extent that causes a high cost in terms of bitrate after encoding.

Furthermore, the predefined offset compression threshold can be set such that artifacts or other quality issues of the resulting video that may arise in low contrast regions are avoided. To identify such a threshold for the offset compression empirical testing may be performed using different offset compression threshold and evaluation of the encoded video in terms of existence of artifacts or other quality issues. The predefined offset compression threshold may be defined in each low contrast region based on the contrast in the respective low contrast region. The predefined offset compression threshold will typically be set lower in a first low contrast region than the predefined offset compression threshold set in a second low contrast region if the first low contrast region has a lower contrast than the second low contrast region. The predefined offset compression threshold may also depend on the reference compression value.

The encoder 110 is then configured to encode the image frame using the set compression levels resulting from the setting function 142, identifying function 144, and restricting function 146. The encoder 110 may for example be adapted to encode according to H.264 or H.265 video compression standard.

The setting function 142 and the restricting function 146 may be a combined function configured to set the respective offset compression value for each of the plurality of pixel blocks based on an interest level associated with the pixel block wherein, for pixel blocks within the one or more low contrast regions having set offset compression values based on the associated interest level higher than the predefined offset compression threshold, the set offset compression values are selectively restricted to be at most equal to the predefined offset compression threshold. Hence, when the offset compression values are set, pixel blocks within the one or more low contrast regions are restricted such that if a pixel block in the one or more low contrast region would have an offset compression value set based on the associated interest level which is higher than the predefined offset compression threshold, the offset compression value will be set to the predefined offset compression threshold for that pixel block. In other words, the combined function is configured to, for each pixel block in the low contrast regions, set the offset compression value to the lower of the offset compression threshold and the offset compression value based on the interest level associated to the pixel block. Additionally, the setting function 142 may be further combined with an increasing function (not shown) to form a further combined function in which the set offset compression values are selectively increased to be at most equal to the predefined offset compression threshold. Hence, when the offset compression values are set, pixel blocks within the one or more low contrast regions are further also increased such that if a pixel block in the one or more low contrast region would have an offset compression value set based on the associated interest level which is lower than the predefined offset compression threshold, the offset compression value will be set to an offset compression value which is higher than the offset compression value set based on the associated interest level but lower than the predefined offset compression threshold for that pixel block. For example, the increase may be by a percentage of the difference between the offset compression threshold and the offset compression value set based on the associated interest level. In alternative, the increase of the offset compression value may be up to a predetermined offset compression value lower than the predefined offset compression threshold for that pixel block. In the latter case, the increase is only applied if the offset compression value set based on the associated interest level is lower than the predetermined offset compression value.

In alternative, the setting function 142 and the restricting function 146 are separate functions. The restricting function 146 is then configured to selectively reduce the set offset compression values to be at most equal to the predefined offset compression threshold for pixel blocks within the one or more low contrast regions having set offset compression values by the setting function 142 based on the associated interest level that are higher than the predefined offset compression threshold. Also, in this case, the offset compression value is in the end set to the lower of the offset compression threshold and the offset compression value based on the interest level associated to the pixel block. Additionally, a separate increasing function (not shown) may be added. The increasing function is configured to selectively increase the set offset compression values to be equal to the predefined offset compression threshold for pixel blocks within the one or more low contrast regions having set offset compression values by the setting function 142 based on the associated interest level that are lower than the predefined offset compression threshold.

Compression values may relate to different measures and properties that indicate a level of compression. The compression may for example be specified by means of a quantization parameter (QP) and the reference compression value is then a reference QP value in relation to which offset compression values are defined in the form of offset QP values. The restricting function 146 is then configured to selectively restrict the set offset QP values to a predefined offset QP threshold. The thus set offset QP value for each pixel block may then be provided in a quantization parameter map (QMAP) used for instructing the encoder 110 to encode the image frame using the set offset QP values according to the QMAP. The offset QP values may for example be expressed as additive offsets. In such a case, the QP value of a pixel block is obtained by adding the offset QP value of the pixel block to the reference QP value.

Figure 2:
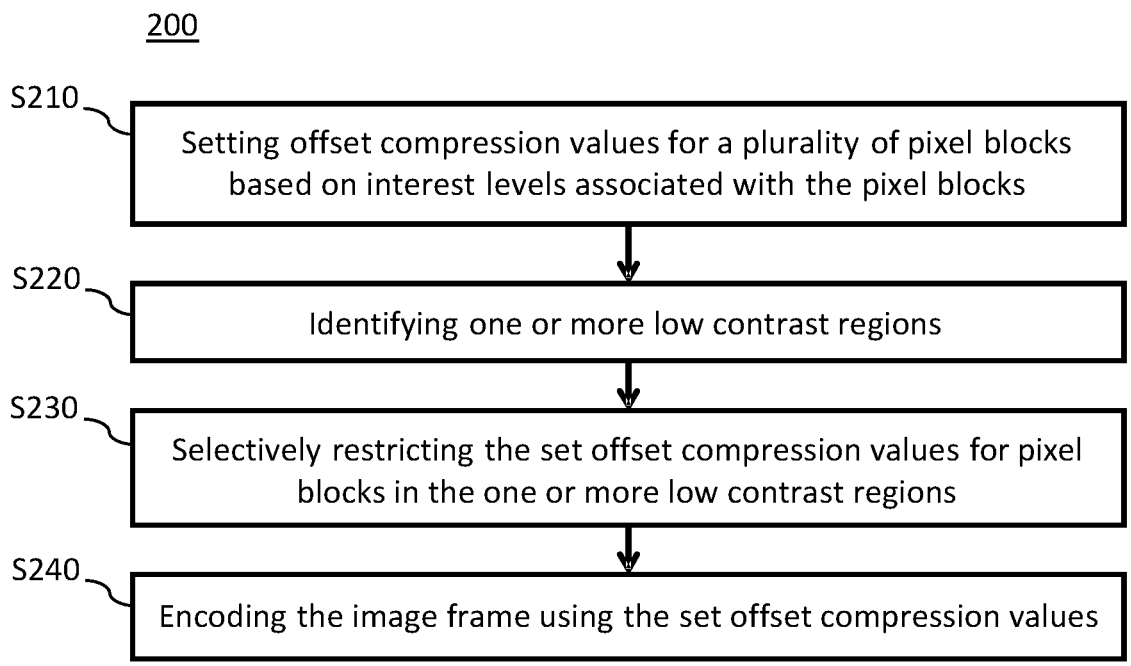
FIG. 2 is a flow chart of a method for encoding an image frame comprising a plurality of pixel blocks according to the present disclosure.

In connection with FIG. 2, a method 200 for encoding an image frame comprising a plurality of pixel blocks according to the present disclosure will be discussed. The steps of the method 200 may be performed by the encoding device 100 described above.

The method comprises setting S210 a respective offset compression value for each of the plurality of pixel blocks based on an interest level associated with the pixel block, wherein each offset compression value defines an offset in relation to a reference compression value set for the image frame. The method further comprises identifying S220, in the image frame, one or more low contrast regions having a local contrast which is below a predefined contrast threshold, and, for pixel blocks within the one or more low contrast regions having set offset compression values based on the associated interest levels higher than a predefined offset compression threshold, selectively restricting S230 the set offset compression values to be at most equal to the predefined offset compression threshold. The method further comprises encoding S240 the image frame using the set offset compression values.

Setting S210 of the offset compression values and selectively restricting S230 the set offset compression values may be made concurrently, such that the respective offset compression value for each of the plurality of pixel blocks is set based on an interest level associated with the pixel block, wherein, for pixel blocks within the one or more low contrast regions having set offset compression values based on the associated interest level higher than the predefined offset compression threshold, the set offset compression values are selectively restricted to be at most equal to the predefined offset compression threshold. Hence, when the offset compression values are set, pixel blocks within the one or more low contrast regions are restricted such that if a pixel block in the one or more low contrast region would have an offset compression value set based on the associated interest level which is higher than the predefined offset compression threshold, the offset compression value will be set to the offset compression threshold for that pixel block.

Alternatively, setting S210 the offset compression values may be performed before and separately from selectively restricting S230 the set offset compression values. Selectively restricting the set offset compression values then comprises reducing the set offset compression values to be at most equal to the predefined offset compression threshold for pixel blocks within the one or more low contrast regions having set offset compression values based on the associated interest level that are higher than the predefined offset compression threshold.

It is to be noted that identifying S210 the one or more contrast regions may be performed at any time before selectively restricting S220 the set offset values for pixel blocks in the one or more low contrast regions, e.g., before or after setting S210 the offset compression values.

As indicated in relation to FIG. 1, the compression may for example be specified by means of a quantization parameter (QP) and the reference compression value is then a reference QP value in relation to which offset compression values are defined in the form of offset QP values. Offset QP values for pixel blocks within the identified S220 one or more low contrast regions are then selectively restricted S230 to a predefined offset QP threshold. In a scenario the QP offset values are expressed as additive offsets, the interest level of regions is divided in 16 levels, the QP value can be a value from 0 to 51, the QP reference value is set to 25, and each interest level is set to correspond to an offset QP value at steps of 3. The interest level of 0 will in such a scenario correspond to an offset QP value of 24 and the equivalent QP value is thus 25 plus 24, i.e, 49. The interest level of 16 will correspond to an offset QP value of −24 and the equivalent QP value is thus 25 plus −24, i.e., 1. If the offset QP threshold is set to 5, this will mean that all pixel blocks within low contrast regions, which pixel blocks are also within regions having an interest level of 6 or lower will according to the method 200 of the present disclosure have its offset QP value selectively restricted to 5. All pixel blocks within low contrast regions, which pixel blocks are also within regions having an interest level of 7 or higher will be unaffected by the selective restriction according to the method 200 of the present disclosure, and instead set to 3 or lower according to the associated interest level.

It is to be noted that the above described scenario is only an example. In other scenarios, the number of interest levels used may different and the offset QP values may be selectable such that a smaller range of the possible QP values are used. Furthermore, the compression value may also be defined by some other parameter than QP.

The method 200 and its included steps may be further adapted as the encoding device 100 and its included functions as described in relation to FIG. 1.

The person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for encoding an image frame comprising a plurality of pixel blocks, the method comprising:
setting a respective offset compression value for each of the plurality of pixel blocks based on an interest level associated with the pixel block, wherein each offset compression value defines an offset in relation to a reference compression value set for the image frame;
identifying, in the image frame, one or more low contrast regions having a contrast which is below a predefined contrast threshold;
for pixel blocks within the one or more low contrast regions having set offset compression values based on the associated interest levels higher than a predefined offset compression threshold, selectively restricting the set offset compression values to be at most equal to the predefined offset compression threshold; and
encoding the image frame using the set offset compression values.

2. The method according to claim 1, wherein the act of restricting is performed together with the act of setting, such that the act of setting comprises:
setting the respective offset compression value for each of the plurality of pixel blocks based on an interest level associated with the pixel block, wherein, for pixel blocks within the one or more low contrast regions having set offset compression values based on the associated interest level higher than the predefined offset compression threshold, the set offset compression values are selectively restricted to be at most equal to the predefined offset compression threshold.

3. The method according to claim 1, wherein the act of setting is performed before the act of restricting, wherein the act of restricting comprises:
for pixel blocks within the one or more low contrast regions having set offset compression values based on the associated interest level higher than the predefined offset compression threshold, reducing the set offset compression values to be at most equal to the predefined offset compression threshold.

4. The method according to claim 1, wherein the image frame comprises a plurality of regions each having a respective interest level, wherein, for each of the plurality of pixel blocks, the interest level associated with the pixel block is an interest level of a region of the plurality of regions in which the pixel block is located.

5. The method according to claim 1, wherein the set offset compression values decrease with increasing interest level.

6. The method according to claim 1, wherein the contrast is a contrast for a region of the image frame comprising more than one pixel block or a contrast for one pixel block.

7. The method according to claim 1, wherein the offset compression values are offset quantization values, the reference compression value is a reference quantization value, and the predefined offset compression threshold is a predefined offset quantization threshold.

8. An encoding device configured to encode an image frame comprising a plurality of pixel blocks, the encoding device comprising:
   circuitry configured to execute:
   a setting function configured to set a respective offset compression value for each of the plurality of pixel blocks based on an interest level associated with the pixel block, wherein each offset compression value defines an offset in relation to a reference compression value set for the image frame,
   an identifying function configured to identify, in the image frame, one or more low contrast regions having a contrast which is below a predefined contrast threshold, and
   a restricting function configured to, for pixel blocks within the one or more low contrast regions having set offset compression values based on the associated interest level higher than a predefined offset compression threshold, selectively restricting the set offset compression values to be at most equal to the predefined offset compression threshold; and
   an encoder configured to encode the image frame using the set offset compression values.

9. The encoding device according to claim 8, wherein the setting function and the restricting function are a combined function configured to set the respective offset compression value for each of the plurality of pixel blocks based on an interest level associated with the pixel block, wherein, for pixel blocks within the one or more low contrast regions having set offset compression values based on the associated interest level higher than the predefined offset compression threshold, the set offset compression values are selectively restricted to be at most equal to the predefined offset compression threshold.

10. The encoding device according to claim 8, wherein the setting function and the restricting function are separate functions, and wherein the restricting function is configured to, for pixel blocks within the one or more low contrast regions having set offset compression values based on the associated interest level higher than the predefined offset compression threshold, reduce the set offset compression values to be at most equal to the predefined offset compression threshold.

11. The encoding device according to claim 8, wherein the image frame comprises a plurality of regions each having a respective interest level, wherein, for each of the plurality of pixel blocks, the interest level associated with the pixel block is an interest level of a region of the plurality of regions in which the pixel block is located.

12. The encoding device according to claim 8, wherein the set offset compression values decrease with increasing interest level.

13. The encoding device according to claim 8, wherein the contrast is a contrast in a region of the image frame comprising more than one pixel block or a local contrast for one pixel block.

14. The encoding device according to claim 8, wherein the offset compression values are offset quantization values, the reference compression value is a reference quantization value, and the predefined offset compression threshold is a predefined offset quantization threshold.

15. A non-transitory computer-readable storage medium having stored thereon instructions for implementing a method for encoding an image frame comprising a plurality of pixel blocks, the method comprising:
   setting a respective offset compression value for each of the plurality of pixel blocks based on an interest level associated with the pixel block, wherein each offset compression value defines an offset in relation to a reference compression value set for the image frame;
   identifying, in the image frame, one or more low contrast regions having a contrast which is below a predefined contrast threshold;
   for pixel blocks within the one or more low contrast regions having set offset compression values based on the associated interest levels higher than a predefined offset compression threshold, selectively restricting (S230) the set offset compression values to be at most equal to the predefined offset compression threshold; and
   encoding the image frame using the set offset compression values.

* * * * *